C. Manson,
Pipe Coupling,
No. 536, Reissued Mar. 9, 1858.
Fig: A.
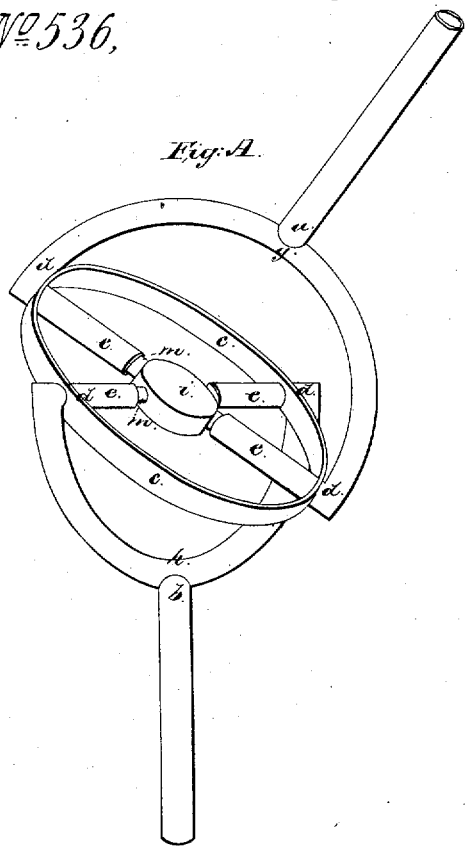
Fig: B.
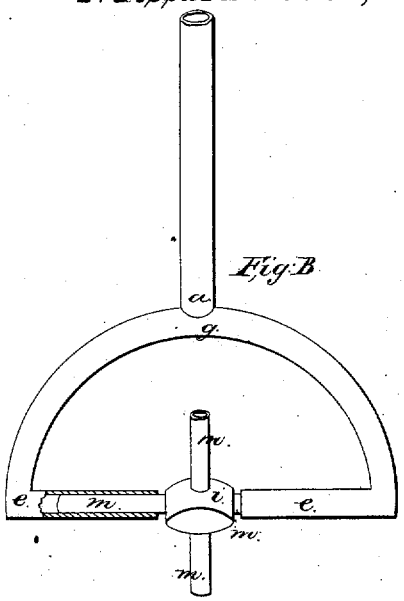
Fig: C.
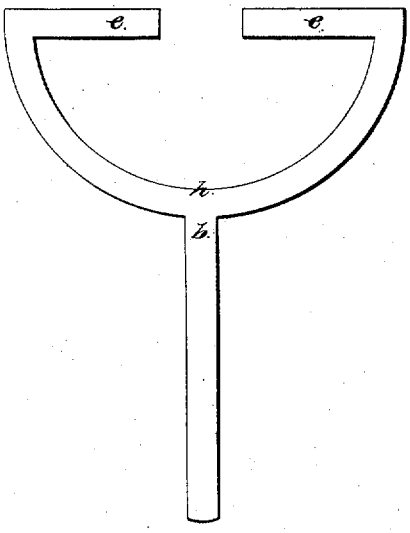
Fig: D.
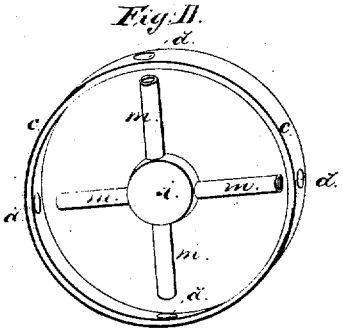
N. PETERS, PHOTO-LITHOGRAPHER, WASHINGTON, D. C.

UNITED STATES PATENT OFFICE.

CHARLES MONSON, OF NEW HAVEN, CONNECTICUT.

IMPROVED GAS-TUBE JOINT.

Specification forming part of Letters Patent No. 19,150, dated January 19, 1858; Reissue No. 536, dated March 9, 1858.

*To all whom it may concern:*

Be it known that I, CHARLES MONSON, of the city and county of New Haven and State of Connecticut, have invented a new and useful Conduit-Joint, which may be termed a Conduit Universal Joint; and I do hereby declare that the same is fully described and represented in the following specification and the accompanying drawings, of which—

Figure A denotes a perspective view of such joint as applied to two conduit-tubes; Fig. B, a side view of one of the armed branches of the joint, with the method of applying the same to the connection-cross, to be hereinafter described; Fig. C, a side view of one of the armed branches affixed to one of the conduit-tubes; Fig. D, a perspective view of the relief ring and the connection-cross.

The object of the said conduit-joint is to enable the direction of a flowing current, whether of gas, a fluid, or vapor, to be changed as circumstances may require. It is particularly designed for gas-light apparatus, where much scope and variety of movement may be desirable in one conduit-tube thereof with respect to another. As applied to a gas burner or chandelier depending from a ceiling, the conduit-joint is far preferable to a stiff immovable rod, or to a simple joint which will permit the chandelier or burner to be turned or swung in one plane only. It has advantages over the well-known ball-and-socket joint, as when well or properly constructed it needs no packing to prevent it from leaking, a slight amount of lubrication of the rubbing-surfaces sufficing to make it gas-tight.

My said conduit-joint will often be found useful to connect a burner or chandelier with a conduit to be extended from a vertical wall.

In Fig A, *a* and *b* denote the two tubes as connected by the conduit universal joint, each of the said tubes being joined to an armed branch composed of a curved or bent tube, *g* or *h*, and two straight tubes or tubular arms, *e e*, whose axes stand in a straight line with one another. There is to be a free connection or passage from the main conduit-tube through the tube *g* or *h*, and either one or both of its tubular arms *e e*. A cross-connection composed of tubes *m m*, opening into one another, and radiating from a common junction center or joining piece, *i*, (see Figs. A B D,) is employed to conjoin the two-armed branches, each tube *m* of the connection being inserted in an arm, *e*; or, in other words, the tubes *m m m m m* are respectively inserted in the tubes *e e e e* and made to fit closely and render the latter capable of being turned transversely on the former. This arrangement enables either tube *a* or *b* to be moved in two planes at right angles to one another, in which case its arms *e e* will be turned on their respective tubes *m m*, while the other tubes, *m m*, of the connection-piece will be made to turn in their respective arms *e e*. Upon the arms *e e e e* there is a relief-ring, *c*, each arm being carried through the ring and made to turn in a bearing, *d*, formed in the ring to receive it. The purpose of the ring is to prevent more or less strain or wear from accruing to the joints of the tubes *e* and *m*.

It is not essential that all the operative parts of the conduit universal joint should be tubular, provided there be a clear passage through the conduit-joint and from one tube, *a*, to the other, *b*.

The universal joint, unprovided with a conduit-passage and a relief-ring, is not new, as it has long been used as a coupling-joint for shafting; but when made with a conduit-passage leading through it, as described, it becomes a different mechanical device, suitable for either hydraulic or pneumatic purposes. Therefore I do not claim the invention of the well-known universal joint composed of parts not tubular, or having no passage through it by which a fluid can pass from one part to the other connected by such joint; nor do I claim the well-known ball-and-socket joint so formed and applied to, or made to connect, two tubes that there may be a passage through it leading from one to the other of such tubes; but What I do claim as my invention is—

1. A conduit universal joint, made substantially as described—viz., with the armed branches *g h* and their connection-cross jointed together and provided with one or more passages, so arranged in them as to open a communication from one leading tube, *a*, to the other, *b*, with which such conduit-joint may be connected.

The combination of the relief-ring, *c*, or its equivalent, with the armed branches and the connection-cross, the same being arranged therewith substantially in the manner and for the purpose as specified.

In testimony whereof I have hereunto set my signature.

CHARLES MONSON.

Witnesses:
WILLIAM M. WHITNEY,
A. S. MONSON.